(12) United States Patent
Pönitsch et al.

(10) Patent No.: US 11,709,769 B2
(45) Date of Patent: Jul. 25, 2023

(54) METHOD FOR TESTING A MICROSERVICE APPLICATION

(71) Applicant: Siemens Aktiengesellschaft, Munich (DE)

(72) Inventors: Michael Pönitsch, Pullach i. Isartal (DE); Martin Metzker, Poing (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 106 days.

(21) Appl. No.: 17/481,382

(22) Filed: Sep. 22, 2021

(65) Prior Publication Data
US 2022/0100649 A1 Mar. 31, 2022

(30) Foreign Application Priority Data
Sep. 30, 2020 (EP) .................................... 20199353

(51) Int. Cl.
*G06F 11/36* (2006.01)
*G06F 11/30* (2006.01)

(52) U.S. Cl.
CPC ...... *G06F 11/3692* (2013.01); *G06F 11/3075* (2013.01); *G06F 11/3089* (2013.01); *G06F 11/3688* (2013.01)

(58) Field of Classification Search
None
See application file for complete search history.

(56) References Cited

U.S. PATENT DOCUMENTS

| | | | |
|---|---|---|---|
| 2015/0128103 A1 | 5/2015 | Stratton et al. | |
| 2017/0242784 A1 | 8/2017 | Antony et al. | |
| 2019/0102238 A1 | 4/2019 | Caldato et al. | |
| 2019/0235993 A1* | 8/2019 | Modeel | G06F 8/60 |
| 2021/0232485 A1* | 7/2021 | Agarwal | G06F 11/3419 |
| 2021/0279047 A1* | 9/2021 | McLaren | G06F 11/3692 |

* cited by examiner

*Primary Examiner* — Qing Chen
(74) *Attorney, Agent, or Firm* — Schmeiser, Olsen & Watts LLP (57) ABSTRACT

Provided is a method for testing a microservice application with at least one microservice with at least one application programming interface, including: reading characteristic data of the application programming interface of the microservice of the microservice application and ascertaining at least one endpoint of the application programming interface; automatically generating an execution script on the basis of the characteristic data of the application programming interface; automatically generating a test infrastructure, wherein the test infrastructure includes at least one client entity; executing the execution script and transmitting the data query of the execution script by the client entity to the application programming interface of the microservice and receiving corresponding response data of the microservice by the client entity; and ascertaining the transfer characteristic by the client entity.

10 Claims, 3 Drawing Sheets

METHOD FOR TESTING A MICROSERVICE APPLICATION

CROSS-REFERENCE TO RELATED APPLICATIONS

This application claims priority to European Application No. 20199353.2, having a filing date of Sep. 30, 2020, the entire contents of which are hereby incorporated by reference.

FIELD OF TECHNOLOGY

The following relates to a method for testing a microservice application.

BACKGROUND

The microservices which currently dominate the field of software architectures are based on being able to communicate with one another and exchange data very flexibly by way of well-defined application programming interfaces API. The correct specification, documentation and implementation of these APIs and their so-called endpoints is the principal focus of the microservice development of embodiments.

However, on account of the increasing number and greatly shortened release time intervals of microservices, in particular testing of the performance and scaling properties of these API endpoints, which was previously quite time-consuming, is often neglected.

Embodiments of the present invention highlight a way of very effectively and quickly coming to a reliable solution, said solution, in fully automated fashion, covering all essential aspects of a performance and scaling verification for the considered microservice.

Previous approaches for verifying performance and scaling properties of microservices generally contain a specific selection of tests. The tests are derived from non-functional requirements which in turn were formulated within the scope of the established software engineering process. Accordingly, the tests are a product of a top-down development approach and the selection thereof is a recurring activity in software engineering.

SUMMARY

An aspect relates to an improved method for testing microservice applications.

According to one aspect of embodiments of the invention, a method is provided for testing a microservice application with at least one microservice with at least one application programming interface, wherein the method comprises:
reading characteristic data of the application programming interface of the microservice of the microservice application and ascertaining at least one endpoint of the application programming interface, wherein queryable response data of the microservice are defined by way of the endpoint; automatically generating an execution script on the basis of the characteristic data of the application programming interface, wherein the execution script defines at least one data query for invoking the ascertained endpoint and for querying queryable response data and at least one transfer characteristic of a data transfer of the response data, wherein the transfer characteristic facilitates an assessment of the provision of the response data from the microservice as a response to a corresponding data query;
automatically generating a test infrastructure, wherein the test infrastructure comprises at least one client entity, and wherein the client entity is set up to execute the data query of the execution script and receive corresponding response data from the microservice;
executing the execution script and transmitting the data query of the execution script by the client entity to the application programming interface of the microservice and receiving corresponding response data of the microservice by the client entity; and
ascertaining the transfer characteristic by the client entity.

This can achieve the technical advantage of being able to provide a method for testing a microservice application in which a comprehensive test of all services provided by the microservice application is facilitated. To this end, characteristic data of the application programming interfaces of the microservices of the microservice application are initially read and, on the basis thereof, at least one endpoint is ascertained for each application programming interface of the microservices of the microservice application. The endpoint of the application programming interface according to embodiments defines the queryable data provided by the respective microservice. On the basis thereof, at least one execution script is generated automatically, wherein the execution script defines at least one data query for invoking an ascertained endpoint for querying queryable response data and at least one transfer characteristic of a data transfer of the response data. In embodiments, the transfer characteristic facilitates an assessment of the provision of the response data by the microservice. By way of example, the transfer characteristic can describe a time duration required by the microservice for transferring the response data requested in the respective data query. As a result of the automatic generation of the execution step, the respective data query can be adapted individually to the data of the microservice provided by the respective application programming interface.

For a microservice application with a plurality of different microservices, which each provide a number of different data by way of individual application programming interfaces, it is consequently possible by way of the automatic generation of an execution script, by virtue of defining corresponding data queries for all microservices and the corresponding application programming interfaces and the queryable data of the respective microservice provided thereby. What this can achieve is that all available data and, connected therewith, all available services can be tested for the purposes of testing the respective microservices by the corresponding data query. Consequently, this can provide a comprehensive test of the microservice application by virtue of being able to test all services provided by the microservice application by way of corresponding data queries.

Further, it is possible to automatically generate a test infrastructure which comprises at least one client entity which is set up in each case to execute the data queries of the execution script and receive corresponding response data from the microservices of the microservice application. The automatic generation can ensure that the test infrastructure and, in particular, the client entities of the test infrastructure are optimally set up so that it is possible to ensure that testing of the microservice application can be carried out within optimal boundary conditions. Depending on the respective microservices of the microservice application, the client entities can be adapted individually so that individually adapted client entities are generated for each microservice, said client entities being optimally adapted to communicate with the respective microservice via the respective application programming interfaces and to obtain and optionally evaluate correspondingly provided response data from the microservice.

Consequently, an optimal test infrastructure can be provided by the automatic generation of the test infrastructure on the basis of the characteristic data of the respective application programming interfaces of the microservices of the microservice application. What this can achieve is that the generated test infrastructure only comprises the components required for testing the respective microservice application, in particular only comprises client entities. This facilitates a minimal scope of the test infrastructure, as a result of which it is possible to economize both storage capacity and computing power of the data processing device on which the respective test should be carried out. Moreover, the efficiency of the test of the microservice application to be carried out can be increased by way of the optimal adaptation of the test infrastructure to be used, as a result of which it is possible to reduce both a test duration and a computing power required to carry out the test.

Following the automatic generation of the execution scripts and the automatic generation of the test infrastructure, the generated execution scripts can be executed by the client entities of the test infrastructure and corresponding data queries can be transmitted to the microservices of the microservice application. The response data of the respective microservices correspondingly transmitted in response to the data queries are received by client entities of the test infrastructure and corresponding transfer characteristics are ascertained. The respective microservice can be assessed by way of the transfer characteristics ascertained in respect of the transfer. In embodiments, the transfer characteristic can comprise for example a time duration required for the provision of the response data by the respective microservice or a data volume of the respective response data or a success or failure of the transmitted data query. In this way, it is possible to assess the performance of the respective microservice.

On the basis of the assessment of the performance of the respective microservice it is possible to implement an adaptation of the respective microservice which leads to an increase in performance. In embodiments, an increase in the performance of the microservice or the microservice application results in needing a small number of data queries to be made for the purposes of providing the information from the respective microservice to a client using the respective service. In this way, it is consequently possible to reduce both the required computing power of the data processing device on which the respective microservice application is operated and a computing power of the data processing device on which the respective client is operated, as a fewer number of data queries need to be processed. Consequently, the claimed method for testing a microservice application contributions to increasing an efficiency of the respective microservice application and connected therewith to a reduction of the respective computing power for operating the respective microservice application.

Within the meaning of the application, a data query is a query transmitted from a client to the server within the scope of client-server communication, for transmitting a corresponding response message from the server to the respective client. Such a query can relate to the transmission of use data, wherein corresponding response data in such a case may optionally comprise a large data volume. Alternatively, a data query in the form of a service query may merely be directed to triggering a corresponding service of the server and may trigger a confirmation of the execution of the service by the server as a response message. Hence, a data query within the meaning of the application can generally relate to a query message of a client to a server, within the scope of which an execution of a corresponding service is sought after. Within the meaning of embodiments of the invention, a corresponding response message or response data can be a message sent by the server to the respective client as a response to the data query, in which message an execution of the requested service might be confirmed. Response messages or response data may comprise use data with a large data volume or only short confirmation messages of the server.

According to an embodiment, the method further comprises:
ascertaining a plurality of parameters of the application programming interface on the basis of the characteristic data of the application programming interface;
wherein the automatic generation of the execution script comprises a definition of a plurality of data queries for the plurality of parameters and/or for variations of values of the parameters of the application programming interface; and
executing the execution script and transmitting the plurality of data queries of the execution script by the client entity to the application programming interface of the microservice and receiving corresponding response data of the microservice by the client entity.

This can achieve the technical advantage of being able to provide a comprehensive test of the microservice application. Ascertaining the plurality of parameters of the application programming interfaces on the basis of the characteristic data of the application programming interfaces can ensure that a corresponding test can be carried out for all data or services provided by the respective microservices of the microservice application. To this end, a plurality of data queries by which the various parameters can be queried in each case are defined in the execution script or in the execution scripts. In particular, a variation of the individual parameters of the application programming interface can be achieved by way of the plurality of data queries. Consequently, all parameters of the individual microservices provided in the characteristic data of the application programming interfaces can be queried by executing the execution script or the execution scripts by the client entities of the test infrastructure so that a comprehensive test of all possible services provided by the microservice application is facilitated. What this can achieve is that an uninterrupted performance determination of the respective microservice application to be tested and connected therewith an uninterrupted efficiency increase of the respective microservice application are facilitated.

According to an embodiment, the method further comprises:
automatically generating a test plan, wherein a transmission sequence for the plurality of data queries of the execution script is defined in the test plan; and
executing the execution script and transmitting the data queries of the execution script by the client entity to the application programming interface of the microservice according to the test plan.

This can achieve the technical advantage of facilitating an efficient sequence for the test of the microservice application to be tested. By way of the automatic generation of a test plan in which a transmission sequence for the multiplicity of data queries of the execution script is defined, it is possible to provide an embodiment of the test of the microservice application, which test is as time efficient as possible and connected therewith as resource efficient as possible. In embodiments, the test plan can provide for the respective transmission of the plurality of data queries and connected therewith the execution of the test of the microservice application to be tested to be designed as resource efficient and as time efficient as possible so that the test is rendered executable as quickly as possible while requiring a low computing power of the data processing device on which the test of the microservice application to be tested is carried out.

According to an embodiment, further an execution duration and/or number of execution repetitions and/or an execution complexity and/or an execution parallelism and/or an execution distance of the data queries is defined in the test plan, wherein an execution duration describes the time duration of a data query, wherein a number of execution repetitions describes a number of successive executions of a data query, wherein an execution complexity describes a complexity of the parameters of the application programming interface to be queried by the data query, wherein an execution parallelism describes a number of data queries to be executed in parallel by different client entities, and wherein an execution distance describes the spatial distance between the application programming interface and the client entities.

This can achieve the technical advantage of being able to provide a test that is as comprehensive as possible of the microservice application to be tested. In embodiments, the test plan provides for an execution duration or a number of execution repetitions or an execution complexity or an execution parallelism or an execution distance of the data queries to be varied and, in this way, a performance of the respective microservice or the microservice application to be determined. To this end, corresponding transfer characteristics are ascertained for data queries with different execution durations, different execution repetitions, different execution complexities, different execution parallelisms and/or different execution distances and, on the basis thereof, a performance and scalability of the respective microservice or the microservice application is ascertained. As a result, it is possible to provide a fully comprehensive test of the microservice application to be tested.

An execution duration of a data query within the meaning of the application is the time duration required to process the data query. A number of execution repetitions of a data query within the meaning of the application is a number of identical data queries to be executed in succession. An execution complexity of a data query within the meaning of the application is a complexity of the data of the respective microservice to be tested, which data are queried in the respective data query. An execution parallelism of a data query within the meaning of the application is a number of data queries executed in parallel by different client entities. An execution distance of a data query within the meaning of the application describes the spatial distance between the respective microservice application to be tested and the client entity of the test infrastructure transmitting the data query and describes the spatial distance to be bridged during the data transfer.

According to an embodiment, the transfer characteristic comprises a time duration for the data transfer of the response data from the application programming interface to the client entity and/or a data volume of the transferred response data and/or a success/failure of the data query.

This can achieve the technical advantage of being able to provide a precise assessment of the performance of the microservice application to be tested. By virtue of a time duration required for the data transfer of the response data from the respective application programming interface of the microservice to be tested to the client entity proceeding from the time of the issued data query by the client entity being taken into account by way of the transfer characteristic, it is possible to ascertain a temporal efficiency or performance of the respective microservice application to be tested. By virtue of a corresponding adaptation of the respective microservice application being carried out on the basis of the test result, it is possible to achieve an improvement in the time efficiency of the microservice application to be tested, as a result of which it is possible to obtain an efficiency, connected therewith, of the required computing power of the data processing devices operating both the microservice application and the client entities.

As a result of a more time efficient microservice application, it is possible to reduce computing power both on the device executing the application and on the client device on which the services of the microservice application are utilized. The same applies to when the data volume of the transferred response data provided in the case of a data query is considered. When assessing the performance of the respective microservice application to be tested in respect of the data volume of the response data transmitted as a response to correspondingly issued data queries and by correspondingly adapting the microservice application in relation to the data volume of the transmitted response data, it is possible to achieve a greater efficiency of the microservice application.

What can be achieved by an increased average data volume of the transmitted response data from the respective microservices is that a smaller number of successive data queries by the client devices respectively utilizing the service are required for querying the respectively provided response data. This can in turn reduce the required computing power of the data processing device operating the microservice application and of the client device.

Moreover, a data transfer of the response data can be configured more efficiently. If the success or failure rate of the data queries issued during the test is taken into account for determining the performance of the microservice application to be tested and if the respective microservice application is adapted accordingly in relation to the ascertained success or failure rate of issued data queries, it is possible to increase an efficiency of the microservice application. This can in turn achieve needing a smaller number of data queries to be issued to utilize the respective service of the microservice application. This in turn reduces the required computing power, both of the data processing device operating the microservice application and of the client device utilizing the services of the microservice application.

According to an embodiment, the automatic generation of the test infrastructure comprises an execution of at least one generation script in accordance with the infrastructure-as-code principle, wherein the configuration of the test infrastructure, in particular the configuration and/or number of the client entities, is defined in the generation script.

This can achieve the technical advantage of being able to provide a precise and efficient generation of the test infrastructure. What can be achieved by using the infrastructure-as-code principle is that a precise configuration of the infrastructure and in particular the client entities is facilitated such that the infrastructure is restricted exclusively to the components required to carry out the test of the microservice application. As a result, it is possible to save storage capacity and computing power of the data processing system operating the test infrastructure. Moreover, what can be achieved by using the infrastructure-as-code principle is that the test infrastructure is optimally adapted to the required boundary conditions for testing the microservice application. This can achieve a test of the microservice application that is as efficient as possible, as a result of which it is possible to optimize both the performance duration and the required computing power for carrying out the test of the microservice application.

According to an embodiment, the automatic generation of the execution script on the basis of the characteristic data of the application programming interface comprises an execution of programming according to a low-code principle.

This can achieve the technical advantage of facilitating a generation which is as precise and simple as possible of the execution scripts on the basis of the characteristic data of the application programming interfaces of the microservice application to be tested. By using the low-code principle for generating the execution scripts, programming of the execution scripts that is as efficient as possible in terms of computing power is facilitated. Moreover, the execution scripts can be restricted to the required information and can be programmed efficiently in terms of computing power such that an embodiment of the execution scripts likewise only requires minimized computing power.

According to an embodiment, the method is carried out on a server architecture, in particular on a cloud server.

This can achieve the technical advantage of attaining a field of application of the method according to embodiments of the invention that is as broad as possible.

According to an embodiment, the microservice application is set up to control an automation process of an automation system comprising at least one sensor and at least one actuator, wherein the microservice application comprises at least a first microservice, a second microservice and a third microservice, wherein the first to third microservices are set up to communicate with one another by corresponding application programming interfaces, wherein the first microservice is set up to read sensor data from the sensor, wherein the second microservice is set up to process the sensor data read by the first microservice and to generate corresponding control data, and wherein the third microservice is set up to control the actuator on the basis of the control data of the second microservice.

This can achieve the technical advantage of being able to improve the control of an automation process of an automation system, in particular in relation to the performance of the microservices of the microservice application executing the control, the improvement being brought about by the test of the microservice application in accordance with the aforementioned method steps. By determining the performance of the individual microservices of the microservice application and by a corresponding adaptation of the respective microservices, it is consequently possible to improve the control of the automation process.

According to another aspect, a computer program product (non-transitory computer readable storage medium having instructions, which when executed by a processor, perform actions) is provided, said computer program product comprising commands which, when the program is executed by a computer, prompt the latter to carry out the method according to embodiments of the invention.

The above-described properties, features and advantages of embodiments of this invention and the manner in which they are achieved will become clearer and more easily understandable from the explanations of the following much simplified schematic illustrations of preferred exemplary embodiments.

BRIEF DESCRIPTION

Some of the embodiments will be described in detail, with references to the following Figures, wherein like designations denote like members, wherein.

DETAILED DESCRIPTION

Figure 1:
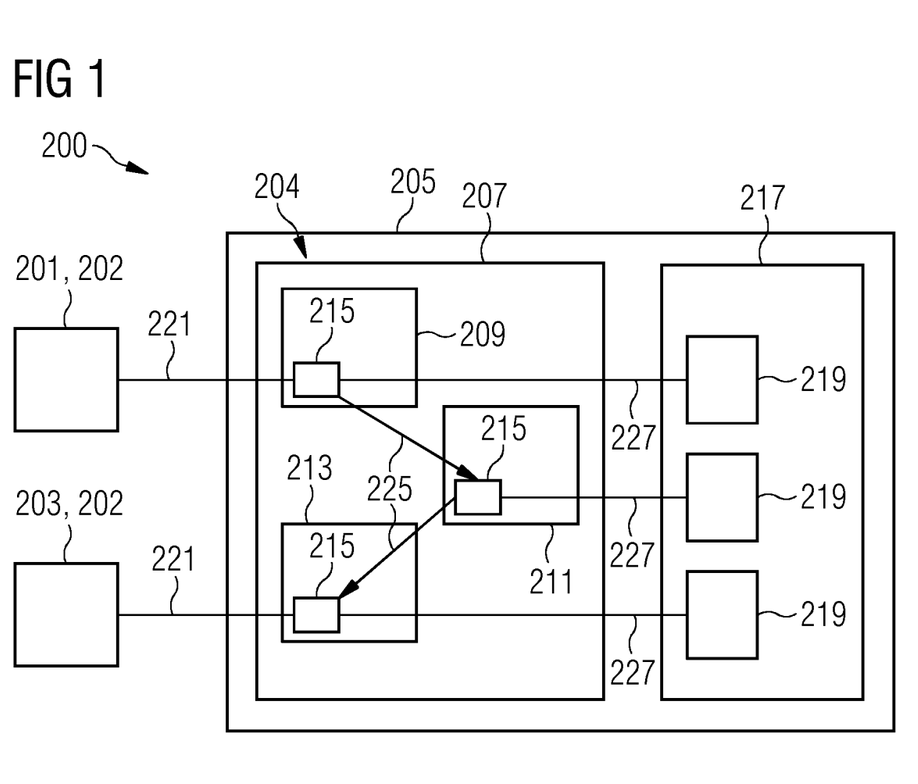
FIG. 1 shows a schematic illustration of an automation system having a microservice application and a test infrastructure according to an embodiment.

FIG. 1 shows a schematic illustration of an automation system 200 having a microservice application 215 and a test infrastructure 217 according to an embodiment.

In the embodiment of FIG. 1, the automation system 200 comprises a control unit 204 which is operated on a server architecture 205, and a plurality of field devices 202. In the embodiment shown, the plurality of field devices 202 comprise a sensor 201 and an actuator 203, which are each connected to the control unit 204 via a data link 221.

The control unit 204 further comprises a microservice application 207. The microservice application 207 comprises a first microservice 209, a second microservice 211 and a third microservice 213. The microservices 209, 211, 213 each comprise an application programming interface 215 and are set up to communicate and exchange data with one another via data communication 225 by way of the application programming interface 215.

In the embodiment shown, the first microservice 209 is set up to read sensor data from the sensor 201. The second microservice 211 is set up to process the sensor data from the sensor 201 and to generate corresponding control data. By contrast, the third microservice 213 is set up to control the actuator 203 on the basis of the control data generated by the second microservice 211. Consequently, an automation process can be controlled in this way.

In the embodiment shown, a test infrastructure 217 with a plurality of client entities 219 is set up furthermore on the server architecture 205. In embodiments, the client entities 219 are set up to transmit data queries 227 to the application programming interfaces 215 of the microservices 209, 211, 213 of the microservice application 207 and to receive and optionally evaluate corresponding response data from the microservices 209, 211, 213. The test infrastructure 217 including the client entities 219 is set up to carry out the method 100 according to embodiments of the invention for testing a microservice application 207 with at least one microservice 209, 211, 213 with at least one application programming interface 215.

The client entities 219 can be embodied as individual entities which can act independently of one another in the test infrastructure 217. Optionally, the individual client entities 219 can be further set up to carry out data communication among themselves. According to an embodiment, the individual client entities 219 can be embodied for example in corresponding work environments, for example container elements, in the form of virtual machines or individually executable runtime environments. The client entities 219 can be embodied in correspondingly adapted fashion on the basis of the microservices to be tested. The client entities 219 are at least set up to transmit corresponding data queries to the microservices 209, 211, 213 to be tested in each case, and to receive and optionally evaluate response data from the microservices.

Deviating from the embodiment shown in FIG. 1, a microservice application 207 to be tested can comprise any number of microservices. Deviating from the embodiment shown in FIG. 1, the microservices of the microservice application 207 may offer any type of service, going beyond the control of an automation process illustrated in FIG. 1. Moreover, data communication between the microservices 209, 211, 213 of a microservice application 207 can have any configuration and can deviate from the form illustrated in FIG. 1.

Deviating from the embodiment shown in FIG. 1, a test infrastructure 217 can have any number of different client entities 219. Moreover, according to an embodiment, the microservice application 207 to be tested and the test infrastructure 217 may be arranged on two different, optionally spatially separated server architectures 205 in a manner deviating from the embodiment shown in FIG. 1. By way of example, these server architectures 205 may be embodied as cloud servers.

Data communication in the form of the transmission of a plurality of data queries 227 and corresponding response data between the client entities 219 of the test infrastructure 217 and the microservices 209, 211, 213 to be tested of the microservice application 207 to be tested can be realized by way of a data bus for example. Alternatively, data communication can be realized via the Internet.

Figure 2:
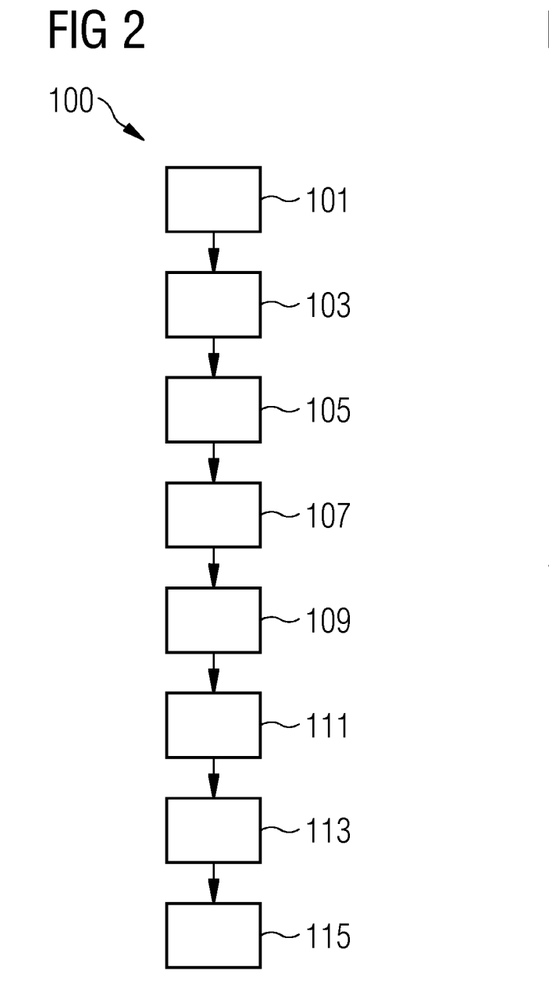
FIG. 2 shows a flowchart of a method for testing a microservice application according to a further embodiment.

FIG. 2 shows a flowchart of a method 100 for testing a microservice application 215 according to an embodiment.

The method 100 for testing a microservice application 207 with at least one microservice 209, 211, 213 with at least one application programming interface 215 is applicable to an automation system 200 as per FIG. 1. In particular, the method 100 according to embodiments of the invention is applicable to a test infrastructure 217 as per FIG. 4.

For the purposes of testing a microservice application 207 with at least one microservice 209, 211, 213 with at least one application programming interface 215, a set of characteristic data of the application programming interface 215 of the microservice 209, 211, 213 to be tested of the microservice application 207 are read and at least one endpoint of the application programming interface 215 is ascertained in a first method step 101. Here, the endpoint of the application programming interface 215 describes the microservice to be tested in each case and thereby defines the response data that are queryable from the respective microservice 209, 211, 213. In embodiments, the queryable response data from the microservice can vary between various microservices and are related to the services provided by the microservice. The characteristic data of the application programming interface 215 can comprise both the queryable response data and the data queries to be formulated in this respect. By way of example, the application programming interface 215 can be formulated as a REST-API or on the basis of a Graph-QL structure.

In a subsequent method step 105, an execution script is generated automatically on the basis of the characteristic data of the application programming interface 215. The execution script defines at least one data query 227 for invoking the ascertained endpoint and for querying the queryable response data of the microservice to be tested.

Moreover, at least one transfer characteristic is defined by the execution script. The transfer characteristic describes a measurable variable, by which an assessment of the data transfer or of the processing of a corresponding data query by the respective microservice to be tested is facilitated.

According to an embodiment, the transfer characteristic may for example comprise a time duration that elapses starting from the transmission of a corresponding data query by a client entity 219 until corresponding response data are transmitted by the microservice to be tested. As an alternative or in addition thereto, a transfer characteristic can comprise a data volume of response data transmitted by the microservice to be tested in response to corresponding data queries. As an alternative or in addition thereto, a transfer characteristic can comprise a success rate or failure rate of issued data queries. Consequently, the performance of the respective microservice to be tested or the microservice application to be tested can be ascertained by the transfer characteristic. By way of example, a data query can be configured in the form of a data request and comprise a request for transmitting desired data of the microservice to be tested, said request corresponding to the communications standard defined by the application programming interface 215. According to one embodiment, the automatically generated execution script may comprise any number of different data queries. In particular, for a test infrastructure 217 with any number of different client entities 219, individually adapted data queries may be defined for each client entity 219. Likewise, a plurality of different data queries, which are individually adapted to each microservice to be tested, can be defined in the automatically generated execution script for a microservice application 207 to be tested with a plurality of different microservices.

A test infrastructure 217 is generated automatically in a subsequent method step 107. The test infrastructure 217 comprises at least one client entity 219 which is set up to transmit data queries 227 of the execution script to the respective microservice application 207 to be tested and to receive and optionally process corresponding response data from the microservices 209, 211, 213 of the microservice application 207 to be tested.

A temporal sequence of method steps 105 and 107 is not implied by the illustration presented here. In particular, method steps 105, 107 can be carried out successively in time or parallel in time.

As described above, the test infrastructure 217 can be set up on a server architecture 215, for example a cloud server, and can comprise any number of client entities 219. The number of client entities 219 including the respective individual configuration of the individual client entities 219 can be adapted on an individual basis to the microservice application 207 to be tested or to the microservices 209, 211, 213 to be tested of the microservice application 207.

In a method step 109, the execution script is executed by the client entity 219 or the plurality of client entities 219 of the test infrastructure 217 and, in a method step 111, corresponding data requests 227 are transmitted by the client entities 219 to the application programming interfaces 215 of the microservices 209, 211, 213 to be tested. By contrast, corresponding response data from the microservices 209, 211, 213 are received by the respective client entities 219 in a method step 213.

After receiving the respective response data by the client entities 219, the respective transfer characteristic is ascertained in a method step 215. As described above, the transfer characteristic can comprise for example a time duration that has elapsed between transmission of the data query and reception of the response data provided, the data volume of the response data provided or a success or failure of the respective data query. In embodiments, a data query is successful if the data requested in the data query are provided error-free by the respective microservice.

A performance of the microservice application 207 to be tested can be determined on the basis of the ascertained transfer characteristic. A short transfer duration or a high success rate and a low failure rate of the respective data queries can for example lead to a high performance of the tested microservice in embodiments.

The ascertainment of the transfer characteristic and the assessment of the performance, determined therefrom, of the tested microservices can be carried out for example by the individual client entities 219 of the test infrastructure 217. Alternatively, the test infrastructure 217 can comprise an additional assessment module, not illustrated in FIG. 1, for assessing the performance on the basis of the ascertained transfer characteristics.

Changes in the microservice application 207 or in the respective microservices can be carried out on the basis of the test result of the method 100, in particular on the basis of the ascertained performance of the tested microservice application 207, in order thereby to obtain a microservice application 207 with an improved performance.

Figure 3:
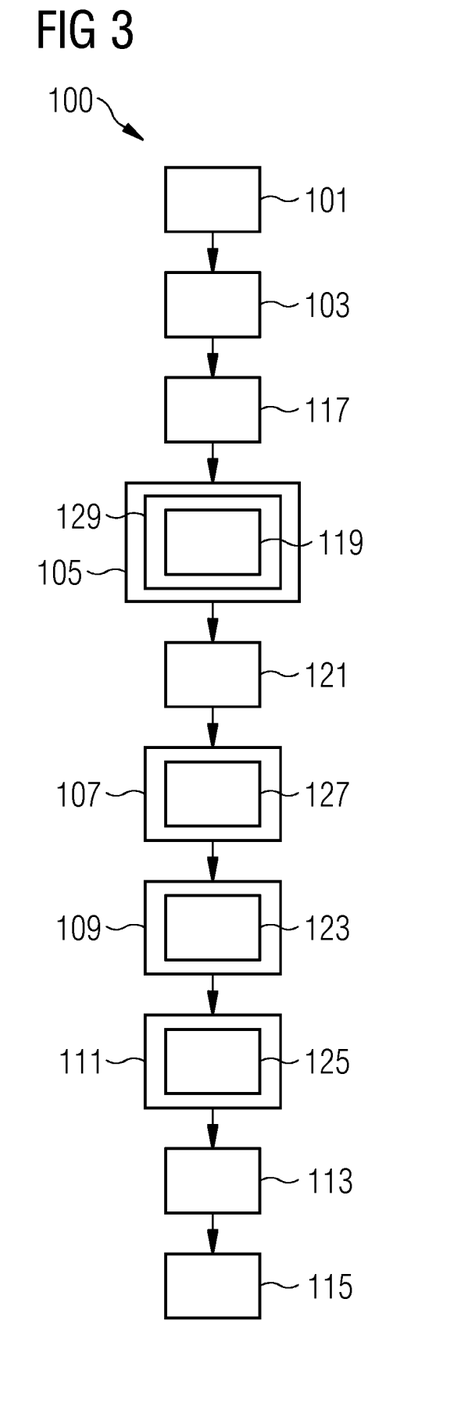
FIG. 3 shows a further flowchart of the method for testing a microservice application according to a further embodiment.

FIG. 3 shows a further flowchart of the method 100 for testing a microservice application 215 according to a further embodiment.

The embodiment in FIG. 3 is based on the embodiment in FIG. 2 and comprises all the method steps described therein. Provided these remain unchanged in the embodiment of FIG. 3, a renewed detailed description is omitted.

Deviating from the embodiment in FIG. 2, the method 100 in the embodiment of FIG. 3 comprises a method step 117. Parameters of the application programming interface 215 are ascertained in method step 117 on the basis of the characteristic data of the application programming interfaces 215. In embodiments, parameters of the application programming interface 215 describe individual aspects of the data made available by the respective microservice. In particular, the parameters can within the scope of a data request relate both to the request body and to the request header of a corresponding data query. Depending on the configuration of the microservice to be tested in each case, different aspects of the data provided by the respective microservice 209, 211, 213 and, connected therewith, the services provided by the microservice 209, 211, 213 can be described by the parameters defined in accordance with the characteristic data of the respective application programming interface 215.

During the automatic generation of the execution script in method step 105, corresponding data queries are defined in a method step 119 on the basis of the characteristic data of the application programming interfaces 215 and the ascertained parameters. In embodiments, individual data queries can be adapted to individual parameters or groups of parameters of the application programming interface 215 such that any parameters of the application programming interface 215 can be queried on an individual basis or in any combination with further parameters by way of corresponding data queries. Moreover, data queries by which individual parameters are varied over a value range specified by the application programming interface 215 can be defined in the execution script. By transmitting the respective data queries, it is consequently possible to obtain any variation of the individual parameters of the application programming interface 215. Consequently, the subsequent transmission of these data queries allows a microservice to be tested in relation to each provided parameter of the application programming interface 215 over the entire predefined value range of the respective parameter in relation to the respective performance of the microservice.

According to the embodiment of FIG. 3, the automatic generation of the execution script comprises an execution of low-code programming as per a method step 129. Consequently, on the basis of the read characteristic data of the application programming interfaces 215, it is possible by executing the low-code programming to automatically generate the desired execution script including the data queries defined therein.

Further, in a method step 121, a test plan is automatically generated for the purposes of executing the execution script by the client entities 219 of the test infrastructure 217. A sequence of transmitting the plurality of different data queries by the plurality of client entities 219 can be defined in the test plan. In embodiments, the test plan can be configured in such a way that an execution of the execution script that is as time-efficient as possible and connected therewith a transmission of the individual data queries 227 by the client entities 219 that is as time-efficient as possible are achieved.

In the shown embodiment, the automatic generation of the test infrastructure in method step 107 further comprises an automatic execution of a generation script as per the infrastructure-as-code principle in a method step 127. Consequently, the test infrastructure can be established automatically in accordance with the structure defined in the infrastructure-as-code generation script.

In the embodiment shown, the execution of the execution script in method step 109 is undertaken as per method step 123 in accordance with the defined test plan.

Analogously, the data queries 227 defined in the execution script are transmitted in accordance with the test plan by the individual client entities 219 to the respective addressed microservices 209, 211, 213 to be tested in a method step 125.

Figure 4:
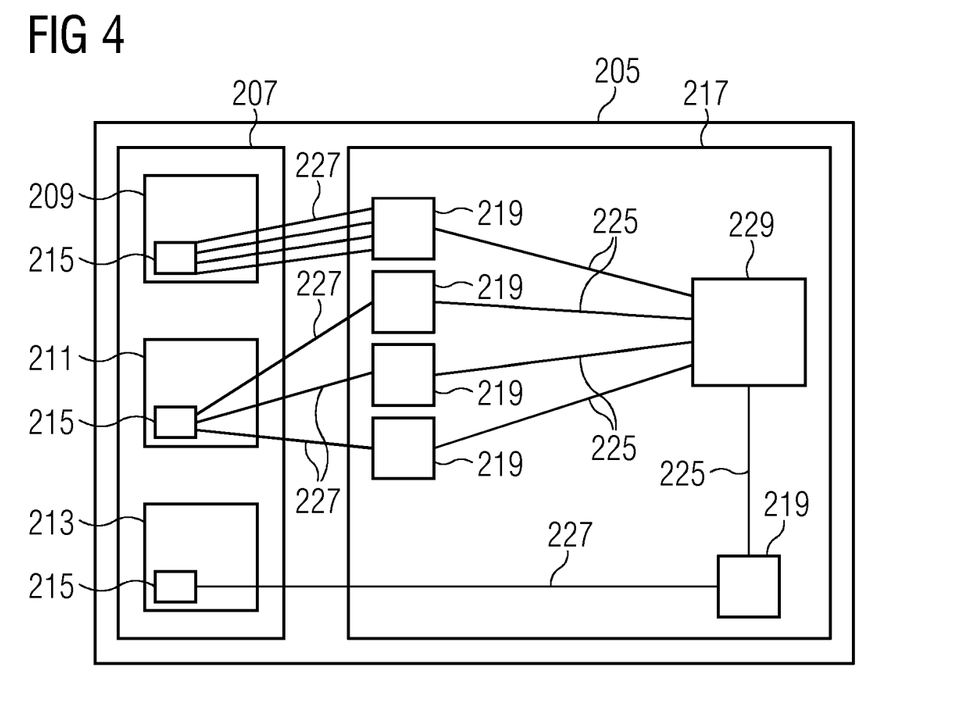
FIG. 4 shows a schematic illustration of a microservice application and a test architecture according to an embodiment.

FIG. 4 shows a schematic illustration of a microservice application 215 and a test architecture 217 according to an embodiment.

In a manner analogous to the embodiment in FIG. 1, the microservice application 207 to be tested and the test infrastructure 217 are set up on a common server architecture 205 in the embodiment in FIG. 4. As already mentioned above, the microservice application 207 and the test infrastructure 217 can alternatively be set up on individual and spatially separated server architectures.

In the embodiment shown, the microservice application 207 once again comprises a first microservice 209, a second microservice 211 and a third microservice 213, which each have an application programming interface 215. By contrast, the test infrastructure has five client entities 219.

FIG. 4 serves to illustrate a transfer characteristic, in particular an execution repetition of data queries, an execution parallelism of data queries and an execution distance of data queries.

In the embodiment shown, a plurality of data queries 227 are transmitted by a client entity 219 of the test infrastructure 217 to the first microservice 209, in particular to the application programming interface 215 of the first microservice 209. In embodiments, the individual data queries 227 are transmitted successively in time in a specified sequence by the respective client entity 219. By the corresponding provision by the first microservice 209 of the response data requested in each case in the data queries 227, it is possible to ascertain a performance of the respective microservice in the case of a corresponding execution repetition in the form of the data queries which are transmitted repeatedly in temporal succession. In embodiments, the individual data queries 227 can be identical data queries which each request the same response data. It is possible in the individual data queries to query correspondingly different parameters of the parameters made available by the application programming interface 217. In particular, a variation of the queried parameters can be achieved by the plurality of repeatedly executed data queries by virtue of the queried parameters being varied within a predetermined value range in the various data queries. To determine the performance of the respective microservice, it is possible to ascertain the transfer characteristic. To this end, it is possible for example to measure the time duration between the transmission of a data query and the provision of the corresponding response data.

Alternatively, a data volume, for example an average data volume, of the response data provided by the respective microservice in response to the transmitted data queries can be ascertained. Alternatively, it is possible to determine a success or failure rate of the transmitted data queries. On the basis of the ascertained transfer characteristic it is consequently possible to assess a corresponding performance of the tested microservice, in which for example a short transfer duration or a high success rate and low failure rate is assessed as a high performance of the respective microservice. A corresponding evaluation of the ascertained transfer characteristic and based thereon an assessment of the performance of the tested microservice can be undertaken, for example, by an assessment module 229 of the test infrastructure 217. To this end, the assessment module 229 is connected to the client entities 219 via a data communication 225.

In the shown embodiment, data queries 227 are transmitted to the second microservice 211 in parallel by three client entities 219. An execution parallelism is represented by the parallel transmission of data queries 227 of a plurality of client entities 219 to a microservice to be tested. By receiving corresponding response data of the addressed microservice 211 and correspondingly determining the transfer characteristic it is consequently possible to ascertain the scalability of the tested microservice 211. By way of the scalability it is possible to ascertain a reaction or performance of the tested microservice in the case of the simultaneous use by a plurality of clients. As illustrated above, the transfer characteristic can in embodiments comprise a transfer duration, a data volume of the transferred response data or a success or failure rate of the transmitted data queries 227. The individual data queries 227 which are transmitted by various clients in parallel can be identical data queries in embodiments. Alternatively, the data queries 227 can relate to different parameters of the application programming interface 215 of the microservice to be tested.

In FIG. 4, the third microservice 213 receives a data query 227 from a fifth client entity 219, which represents clients with a greater distance from the third microservice 213. This should illustrate an increased transfer distance, in the case of which the data queries 227 to be transmitted and the corresponding response data are transmitted over a longer transfer path. In this way, it is possible to test the performance of the respectively tested microservice for data queries from clients that have to be transferred from a distant transmission point and consequently over an increased transfer path.

As an alternative to the test scenarios illustrated in FIG. 4, a performance of a microservice to be tested can further be determined in relation to a transfer complexity of the information of the microservice queried in the respective data query 227. In embodiments, the transfer complexity describes the complexity of the data of the microservice queried in the data query. Depending on the queried complexity of the data or services of the microservice, it is consequently possible to determine the corresponding performance of the microservice. Alternatively, the performance can be assessed on the basis of an execution duration, during which a duration of the execution of the respective data query is taken into account.

Figure 5:
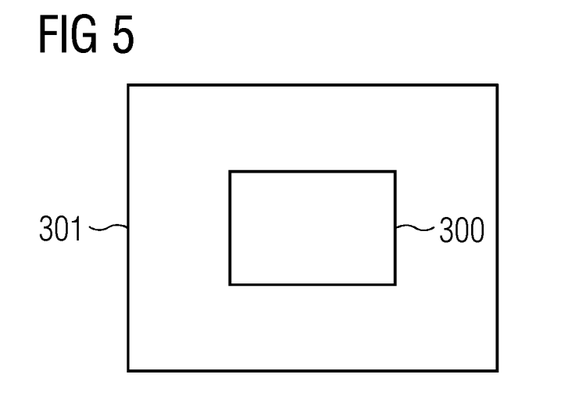
FIG. 5 shows a schematic illustration of a computer program product.

FIG. 5 shows a schematic illustration of a computer program product 300.

The computer program product is stored on a storage medium 301 in the embodiment shown. By way of example, the storage medium 301 can be a hard disk drive of a data processing device, an external hard disk drive or any other storage medium known from the conventional art.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:
1. A method for testing a microservice application with at least one microservice with at least one application programming interface, comprising:
 reading characteristic data of the at least one application programming interface of the at least one microservice of the microservice application and ascertaining at least one endpoint of the at least one application programming interface of the at least one microservice, wherein queryable response data of the at least one microservice are defined by way of the at least one endpoint of the at least one application programming interface of the at least one microservice;
 automatically generating an execution script on a basis of the characteristic data of the at least one application programming interface of the at least one microservice, wherein the execution script defines at least one data query for invoking the at least one endpoint of the at least one application programming interface of the at least one microservice and for querying queryable response data and at least one transfer characteristic of a data transfer of the queryable response data, and wherein the at least one transfer characteristic of the data transfer of the queryable response data facilitates an assessment of a provision of the queryable response data from the at least one microservice as a response to the at least one data query of the execution script;
 automatically generating a test infrastructure, wherein the test infrastructure comprises at least one client entity, and wherein the at least one client entity is set up to execute the at least one data query of the execution script and receive corresponding response data from the at least one microservice;
 executing the execution script and transmitting the at least one data query of the execution script by the at least one client entity to the at least one application programming interface of the at least one microservice and receiving corresponding response data of the at least one microservice by the at least one client entity; and ascertaining the at least one transfer characteristic of the data transfer of the queryable response data by the at least one client entity.

2. The method as claimed in claim 1, further comprising:
ascertaining a plurality of parameters of the at least one application programming interface of the at least one microservice on the basis of the characteristic data of the at least one application programming interface of the at least one microservice;
wherein the automatic generation of the execution script comprises a definition of a plurality of data queries for the plurality of parameters of the at least one application programming interface of the at least one microservice and/or for variations of values of the plurality of parameters of the at least one application programming interface of the at least one microservice; and
executing the execution script and transmitting the plurality of data queries of the execution script by the at least one client entity to the at least one application programming interface of the at least one microservice and receiving corresponding response data of the at least one microservice by the at least one client entity.

3. The method as claimed in claim 2, further comprising:
automatically generating a test plan, wherein a transmission sequence for the plurality of data queries of the execution script is defined in the test plan; and
executing the execution script and transmitting the plurality of data queries of the execution script by the at least one client entity to the at least one application programming interface of the at least one microservice according to the test plan.

4. The method as claimed in claim 3, wherein an execution duration and/or a number of execution repetitions and/or an execution complexity and/or an execution parallelism and/or an execution distance of the plurality of data queries is defined in the test plan, wherein an execution duration describes the time duration of a data query, wherein a number of execution repetitions describes a number of successive executions of a data query, wherein an execution complexity describes a complexity of the plurality of parameters of the at least one application programming interface of the at least one microservice to be queried by the data query, wherein an execution parallelism describes a number of data queries to be executed in parallel by different client entities, and wherein an execution distance describes a spatial distance between the at least one application programming interface of the at least one microservice and the different client entities.

5. The method as claimed in claim 1, wherein the at least one transfer characteristic of the data transfer of the queryable response data comprises a time duration for the data transfer of the queryable response data from the at least one application programming interface of the at least one microservice to the at least one client entity and/or a data volume of the data transfer of the queryable response data and/or a success/failure of the at least one data query of the execution script.

6. The method as claimed in claim 1, wherein the automatic generation of the test infrastructure comprises an execution of at least one generation script in accordance with an infrastructure-as-code principle, and wherein a configuration of the test infrastructure, in particular the configuration of the test infrastructure and/or a number of different client entities, is defined in the at least one generation script.

7. The method as claimed in claim 1, wherein the automatic generation of the execution script on the basis of the characteristic data of the at least one application programming interface of the at least one microservice comprises an execution of programming according to a low-code principle.

8. The method as claimed in claim 1, wherein the method is performed on a server architecture, in particular on a cloud server.

9. The method as claimed in claim 1, wherein the microservice application is set up to control an automation process of an automation system comprising at least one sensor and at least one actuator, wherein the microservice application comprises at least a first microservice, a second microservice, and a third microservice, wherein the first to third microservices are set up to communicate with one another by corresponding application programming interfaces, wherein the first microservice is set up to read sensor data from the at least one sensor, wherein the second microservice is set up to process the sensor data read by the first microservice and to generate corresponding control data, and wherein the third microservice is set up to control the at least one actuator on a basis of the corresponding control data of the second microservice.

10. A computer program product, comprising a non-transitory computer readable storage medium having computer readable program code stored therein, the computer readable program code comprising commands which, when the computer readable program code is executed by a computer, perform the method as claimed in claim 1.

\* \* \* \* \*